United States Patent
Miao

(10) Patent No.: US 7,653,933 B2
(45) Date of Patent: Jan. 26, 2010

(54) SYSTEM AND METHOD OF NETWORK AUTHENTICATION, AUTHORIZATION AND ACCOUNTING

(75) Inventor: Fuyou Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 602 days.

(21) Appl. No.: 10/558,751

(22) PCT Filed: Dec. 31, 2003

(86) PCT No.: PCT/CN03/01162

§ 371 (c)(1),
(2), (4) Date: Dec. 1, 2005

(87) PCT Pub. No.: WO2004/107650

PCT Pub. Date: Dec. 9, 2004

(65) Prior Publication Data

US 2008/0235770 A1    Sep. 25, 2008

(30) Foreign Application Priority Data

Jun. 2, 2003    (CN) ............................. 03 1 37267

(51) Int. Cl.
  G06F 7/04      (2006.01)
  G06F 15/16     (2006.01)
  G06F 17/30     (2006.01)
  G06F 9/00      (2006.01)
  H04L 29/06     (2006.01)
  G06F 17/00     (2006.01)
  G06F 15/177    (2006.01)

(52) U.S. Cl. ............................. 726/4; 726/15; 709/220; 709/228

(58) Field of Classification Search .................. 726/4, 726/15; 709/220, 228
See application file for complete search history.

(56) References Cited

U.S. PATENT DOCUMENTS 6,311,275 B1    10/2001    Jin et al.

(Continued)

FOREIGN PATENT DOCUMENTS

CN    1458770 A    11/2003
EP    1191763 A2   3/2002

*Primary Examiner*—Shin-Hon Chen
(74) *Attorney, Agent, or Firm*—Slater & Matsil, L.L.P.

(57) ABSTRACT

A network authentication, authorization and accounting system and a method thereof, wherein said system comprises: a subscriber device, via which a subscriber is connected with the network; an access server, connected with the subscriber device and designed to enable the subscriber device to access the network; an AAA server, connected with the access server and designed to collaborate with the access server to accomplish authentication, authorization, and accounting for the subscriber accessing the network; a service server, connected with the access server, designed to provide specific services, to exchange authentication and authorization information with the AAA server, and to interact with the subscriber device to provide the service; a service accounting server, connected with the service server, designed to collaborate with the service server to accomplish accounting for service resource use of the subscriber, and to send the accounting data to the AAA server. Accordingly, the present invention also discloses a network authentication, authorization and accounting method. The present invention enables a subscriber to access different types of services with only the subscriber identification information (user name and password) through a single identity authentication process, and supports centralized accounting.

16 Claims, 4 Drawing Sheets

U.S. PATENT DOCUMENTS 6,385,653 B1 * 5/2002 Sitaraman et al. ........... 709/230
7,328,268 B1 * 2/2008 Foltak et al. ................ 709/228
2003/0039210 A1 * 2/2003 Jin et al. ..................... 370/229
2003/0233572 A1 * 12/2003 Van Ackere et al. ......... 713/200

* cited by examiner

SYSTEM AND METHOD OF NETWORK AUTHENTICATION, AUTHORIZATION AND ACCOUNTING

FIELD OF THE INVENTION

The present invention relates to network operation and management, particularly to a network authentication, authorization and accounting system and a method thereof.

BACKGROUND OF THE INVENTION

Since the appearance of network, the Authentication, Authorization and Accounting (AAA) system has been the foundation of network operation. The use of all kinds of resources in network should be managed by authorization, authentication, and accounting, wherein:

Authentication refers to the verification of subscriber identity when the subscriber uses resource in the network system. During the process, the subscriber identity information (e.g., acquisition of combination of user name—password, and biological characteristics, etc.) is obtained through intercommunication with the subscriber; then the information is submitted to the authentication server (AAA server 3), which verifies and processes the identity information and the subscriber information stored in the database and verify whether the subscriber identity is correct according to the processing result. For example, the GSM mobile communication system can identify network terminal IDs and user IDs in the network.

Authorization refers that the network system authorizes a subscriber to use the resource in it in a specific manner. This process specifies the available services and right (e.g., allocated IP address, etc.) of the subscriber after the subscriber logs in the network. For example, in the case of a GSM mobile communication system, the service right (whether international telephone call service is available, etc.) of an authenticated legal subscriber is defined in the agreement between the subscriber and the operator.

Accounting refers that the network system collects and records subscriber's use of network resources, so as to charge the subscriber for resource use or for auditing purpose, etc. For example, in the case of an Internet Service Provider (ISP), the subscriber's network access and use activities can be recorded accurately by traffic or by time.

To use services provided by the network normally, a network subscriber has to possess the access capability to network resources (i.e., network infrastructure) and network service resources. Therefore, AAA is required on two layers: on the layer of network resources, authentication, authorization and accounting of the subscriber is performed by an Internet Access Providers (IAP); on the layer of network service, authentication, authorization and accounting of the subscriber is performed by an ISP.

There are two classes of services in current network: the first class involves common data services, such as Web access, FTP (File Transfer Protocol), and e-mail, etc; this class of services is provided by ISPs in a free of charge manner (income is earned on advertisements, or the services are used internally in the organization); accordingly, for Internet access providers, accounting is basically performed by traffic, duration, or combination of both; the authentication of subscriber identity is accomplished by AAA facilities of network infrastructure providers at the edge of network; in addition, there is no service-related identity authentication, authorization and accounting. This class of services usually has low requirements for Quality of Service (QoS), and the requirements can be met by the network through forwarding data in best-effort delivery mode; due to the low degree of coupling between the services and the network, subscribers are only charged for network access by the network infrastructure providers. For ISPs, the cost of provision of services can be covered through charging for advertisements, providing authentication and accounting at service providing locations, or providing service for own organizations.

The second class in the network involves services requiring QoS assurance, such as IP Phone, NGN (Next Generation Network, Videoconference, Online Broadcast/TV and VOD (Video On Demand), etc; this class of services requires the network to provide different levels of QoS protection; otherwise such services can't be provided normally. Due to the special requirements for network resources, cooperation with Internet access providers is required to provide such a class of services. At present, a basic pattern of providing this class of services is: set up an independent network that provides only this class of services and bind services and network access together, such as VoIP (Voice over IP).

At present, the AAA technology usually uses RADIUS (Remote Authentication Dial-In User Service) protocol as the back end protocol (protocol between Network Access Server (NAS) 2 and AAA server 3), and a corresponding technology is used as the front end protocol (protocol between the subscriber device and NAS) according to the access technology, for example, in Ethernet and WLAN (Wireless LAN), 802.1x is used as the front end protocol. The existing AAA frame structure is shown in FIG. 1: when receiving a connection request from the subscriber device 1, the access server 2 (i.e., NAS) encapsulates the request message into a protocol message supported by the AAA server 3, and then sends the message to the AAA server 3; Through many times of intercommunication between the subscriber device 1 and the AAA server 3, the AAA server 3 sends an instruction for permitting subscriber access to the access server 2. In this way, the authorized subscriber device 1 can access the network 4.

In the above solution, for the first class of services, the network per se cannot control the services; instead, it can control only the access. For the second class of services, the service access control is combined with the access control, and the Access Server 2 is both the EP (enhanced point, a device that performs access control) for network access and the EP for service access; therefore, the categories of services that can be provided in the network are limited; in addition, if a new second class of services are to be provided in the network, the Access Server 2 and the AAA server 3 have to be upgraded, e.g., in the case of VoIP.

Another possible solution is to separate service access from network access completely, i.e., both the service provider and Internet access provider have their own AAA server 3 and facilities respectively, so that subscriber authentication, authorization, and accounting are separated from each other.

However, it is difficult to assure QoS since service is separated completely from network. In addition, the subscribers have to maintain multiple sets of identity information, and there are multiple AAA facilities in the network, resulting in degraded accessibility. Particularly, when the Internet access provider and the service provider are not the same entity, it is more inconvenient for settlement.

SUMMARY OF THE INVENTION

The present invention provides a network authentication, authorization and accounting system and a method thereof, which can avoid limitation of existing network devices, assure QoS, and facilitate accounting.

To solve the above problems, the network authentication, authorization and accounting system of the present invention comprises:

a subscriber device, via which a subscriber is connected with the network;

an access server, connected with the subscriber device and designed to enable the subscriber device to access the network;

an AAA server, connected with the access server and designed to collaborate with the access server to accomplish authentication, authorization, and accounting for the subscriber accessing the network;

a service server, connected with the access server, designed to provide specific services, to exchange authentication and authorization information with the AAA server, and to interact with the subscriber device to provide the service;

a service accounting server, connected with the service server, designed to collaborate with the service server to accomplish accounting for service resource use of the subscriber, and to send the accounting data to the AAA server.

Wherein, the access server can provide QoS guarantee for service, while the AAA server incorporates the access accounting data with the service accounting data.

Furthermore, the service accounting server and the AAA server are populated in a single host; the service server is a cluster of devices that provide a type of service and stores service resource use records; the subscriber device may be a computer, handset, telephone, or personal digital assistant.

Accordingly, the network authentication, authorization and accounting method of the present invention comprises the following steps of:

a. a network access request step, in which a subscriber logs in the subscriber device which sends a network access request;

b. an authentication and authorization step, in which the AAA server authenticates the subscriber in collaboration with the access server according to the subscriber identity information, to authorize or refuse the corresponding subscriber device to access the network;

c. a service access request step, in which the subscriber device authorized to access the network sends a service access request containing the subscriber identity information to the service server;

d. a determination and service authorization step, in which the service server searches for the identification information stored in the AAA server via the service accounting server, and determines whether the identification information matches the subscriber identity and the qualification to access the service; if so, the service server accepts the access request and authorize the subscriber device to access the service; otherwise the service server refuses to provide the service;

e. a service accounting step, in which the service server sends the service resource use record to the service accounting server, and the service accounting server creates accounting data according to the service resource use;

f. the AAA server receives the service accounting data and incorporates it with the access accounting data.

Compared with the prior art, the present invention has the following advantages:

1. the present invention separates the service server from the access server, so that classes of services can be added in the network as required, without the need to upgrade existing devices in the network, and thereby facilities service development and deployment in the network;

2. a service accounting server is added to distinguish use of network resources and use of service resources in accounting; in addition, the accounting data can be incorporated through providing a data channel between the AAA server and the service accounting server;

3. it enables a subscriber to access different categories of services with only the subscriber identification information (such as user name and password) through a single identity authentication process; in addition, it supports centralized accounting, which alleviates effort of the subscriber to subscribe the network and services;

4. it facilitates network access providers to control network services and provides a QoS-based accounting channel.

DETAILED DESCRIPTION OF THE EMBODIMENTS

Figure 1:
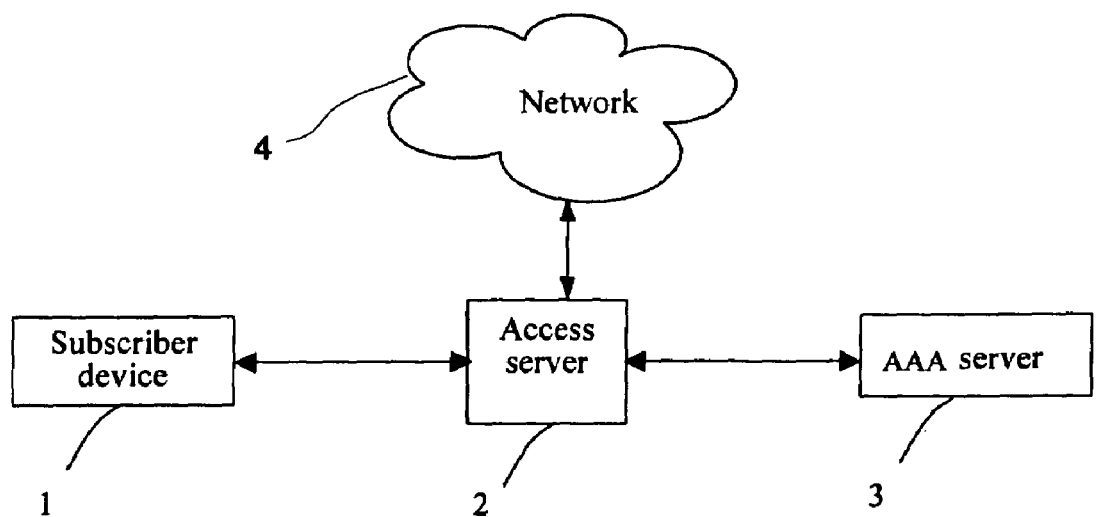
FIG. 1 is a schematic diagram of the existing network authentication, authorization and accounting system.
Figure 2:
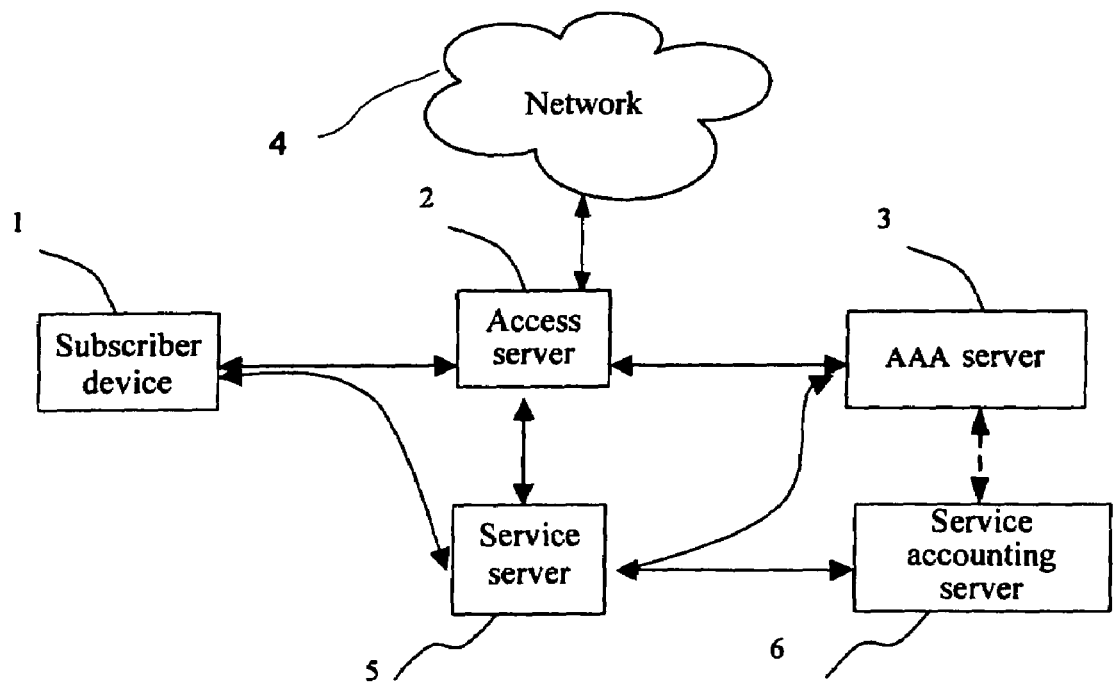
FIG. 2 is a schematic diagram of an embodiment of the network authentication, authorization and accounting system of the present invention.

Referring to FIG. 2, the network authentication, authorization and accounting system comprises:

a subscriber device 1, which is designed to connect a subscriber with the network and may be a computer, a handset, a telephone, or a PDA (Personal Digital Assistant), etc., and may be connected to the network 4 through wireless or cable connection/technology, such as GPRS (General Packet Radio Service), ADSL (Asymmetric Digital Subscriber Line), dial-up, or WLAN, etc., an access server 2, which is connected with the subscriber device 1, and designed to provide a network access service gateway (e.g., GPRS, ADSL, dial-up, WLAN, etc) for the subscriber device 1 through wireless or cable connection/technology; said access server 2 needn't to sense the services but shall sense QoS (Quality of Service). Whether the access server can sense QoS is a network feature, which can be implemented in different ways in the prior art; therefore, it is not described here any more;

an AAA server 3, which is connected with the access server 2, and designed to collaborate with the access server 2 to accomplish authentication, authorization, and accounting for the subscriber accessing the network 4 as well as access of the network 4;

a service server 5, which may be a server that provides services or a cluster of devices that provide a class of service collectively, and is connected with the access server 2, and can exchange authentication and authorization information with the AAA server 3 and interact with the subscriber device 1 to provide the service; furthermore, the service server 5 stores service resource use records;

a service accounting server 6, which is connected with the service server 5, and designed to collaborate with the service server 5 to accomplish accounting for service resource use for the subscriber and send the accounting data to the AAA server 3 periodically or in real-time, and the AAA server 3 integrates the access accounting data with the service accounting data; furthermore, the service accounting server 6 and the AAA server 3 may be a single device.

In above system, the subscriber has to log on the system as follows before he/she applies for network access and relevant services: the subscriber enters its identification information (e.g., user name, password, etc) through the interface of the subscriber device 1; while the network 4 provides the subscriber with a legal access identity according to the subscriber identification information. The network 4 authenticates the subscriber by comparing the subscriber identity information with the identification information stored in the network; wherein, the subscriber identity information comprises the identification information and additional attribute information (e.g., identity ID, computer, location, and qualification for access, etc). In this system, the network authentication and accounting have the same mechanism and process as the existing AAA mechanism.

For the service access control, the subscriber has to present his/her identity information (possibly in the form of PKC/AC (Public Key Certificate/Attribute Certificate), Token, Credential, etc) first and have been verified/authenticated by the AAA server 3 during network access; the service server 5 verifies the subscriber identity information and the authorization information by searching in the AAA server 3 via the service accounting server 6, and authorizes the subscriber to access the service.

Figure 3:
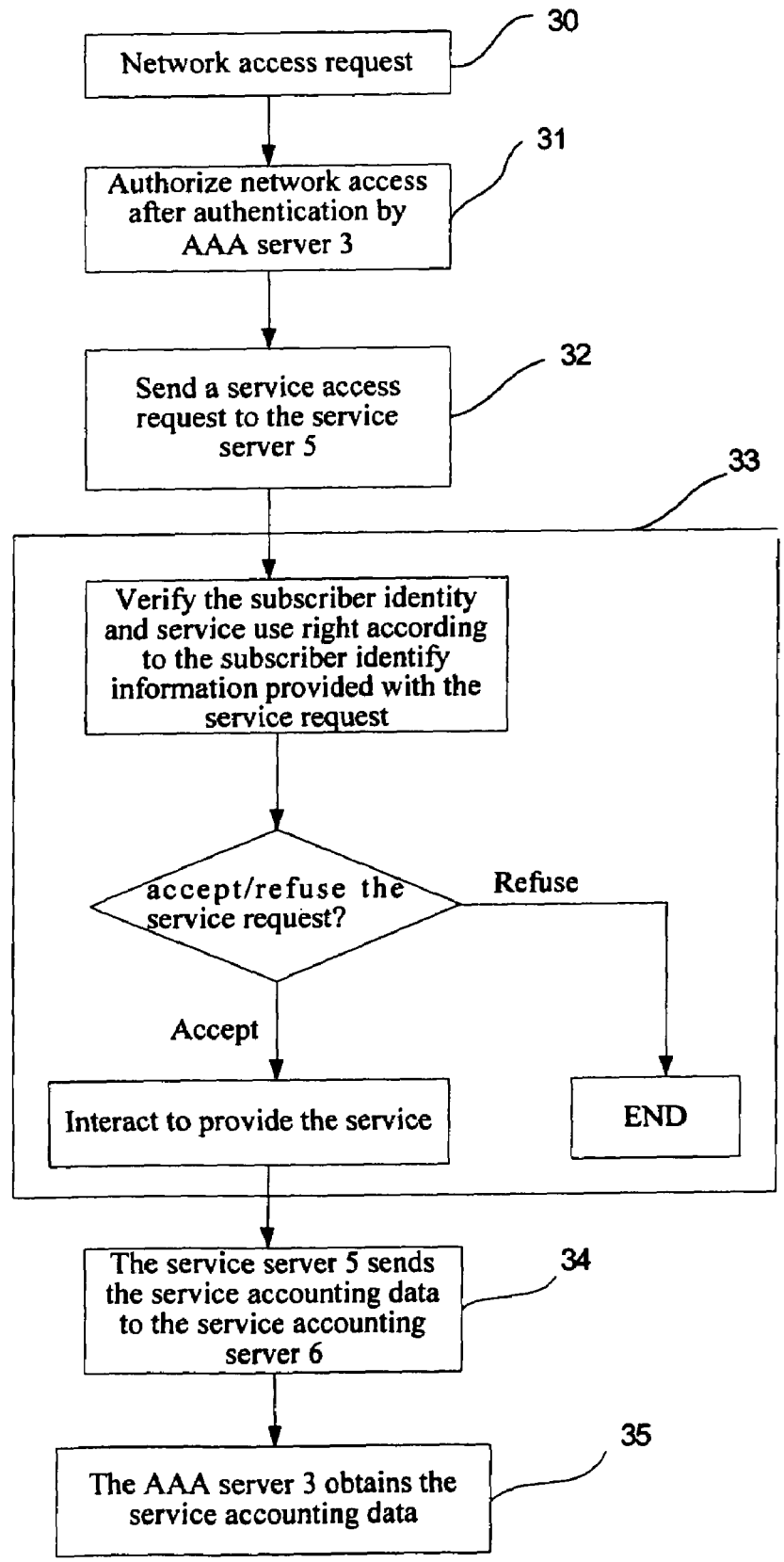
FIG. 3 is a flow diagram of an embodiment of the network authentication, authorization and accounting method of the present invention.
Figure 4:
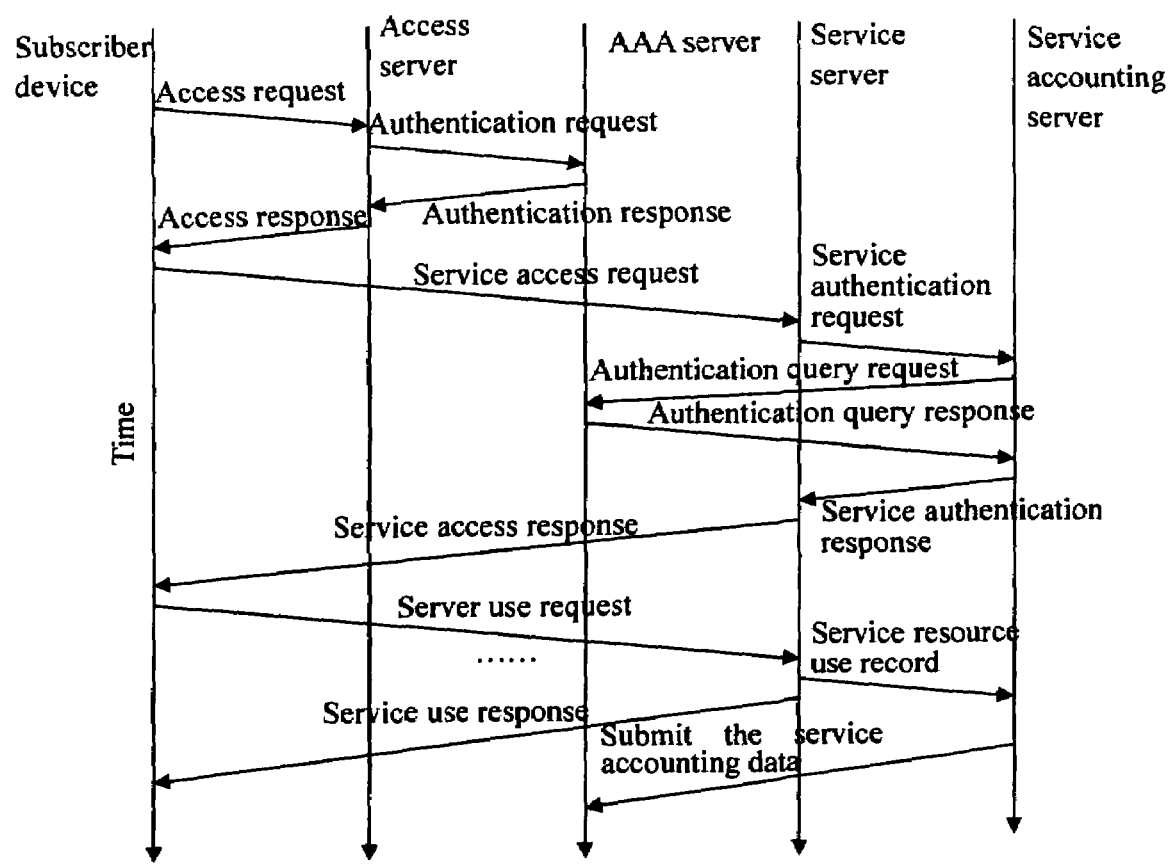
FIG. 4 is a detailed flow diagram of the method shown in FIG. 3.

Please referring to FIG. 3 and FIG. 4, the network authentication, authorization and accounting method of the present invention comprises the following steps of:

a. a network access request step 30, in which the subscriber logs in the subscriber device 1 which sends a network access request;

b. an authentication and authorization step 31, the AAA server 3 authenticates the subscriber in collaboration with the access server 2 according to the subscriber identity information, to authorize or refuse the corresponding subscriber device 1 to access the network 4;

when receiving the access request, the access server 2 sends an authentication request to the AAA server 3;

after authenticating the subscriber, the AAA server 3 sends an authentication response to the access server 2;

when receiving the authentication response, the access server 2 sends an access response to the subscriber device 1, and the subscriber device 1 is authorized or refused to access the network.

c. a service access request step 32, in which when the subscriber accesses a service in the network, the subscriber device 1 authorized to access the network sends a service access request containing the subscriber identity information to the service server 5 providing the service;

d. a determination and service authorization step 33, in which the service server 5 searches for the identification information stored in the AAA server 3 via the service accounting server 6, and determines whether the identification information matches the subscriber identity and the qualification to access the service; if so, the service server 5 accepts the access request and authorizes the subscriber device to access the service; otherwise the service server 5 refuses to provide the service.

Wherein, the service accounting server 6 may determine the qualification of the subscriber independently, but the authentication of the subscriber identity will still be accomplished by the AAA server 3.

Besides the service access request/authentication, the determination and service authorization step may further comprise a service use request/authentication step, i.e., determine the particular qualification of the subscriber according to the condition of service resources and the subscriber identity.

e. a service accounting step 34, in which during the provision of service with interaction or when the provision of service with interaction is completed, the service server 5 sends the service resource use record of the subscriber to the service accounting server 6, then the service accounting server 6 (with common accounting software) calculates the charge for this service according to the service resource use to create accounting data;

f. the AAA server receives the service accounting data 35 and incorporates the access accounting data and service accounting data. The service accounting server 6 sends the accounting data to the AAA server 3 periodically or in event-driven manner, or the AAA server 3 searches in the service accounting server 6 periodically or in event-driven manner to create the accounting data.

As the unique interface to subscribers, the Internet access provider negotiates with the subscribers for service/network use and charge, and negotiates with the service providers for the use of accounting data and allocation of earnings. When the service providers are not the same entity, the above affair is determined by the agreement between the AAA server 3 and the service accounting server. The accounting data transferred from the service accounting server 6 to the AAA server 3 contains a ToS (Type of Service) code and shall also contain the name/serial number of service provider and the service resource use information, etc.

Figure 5:
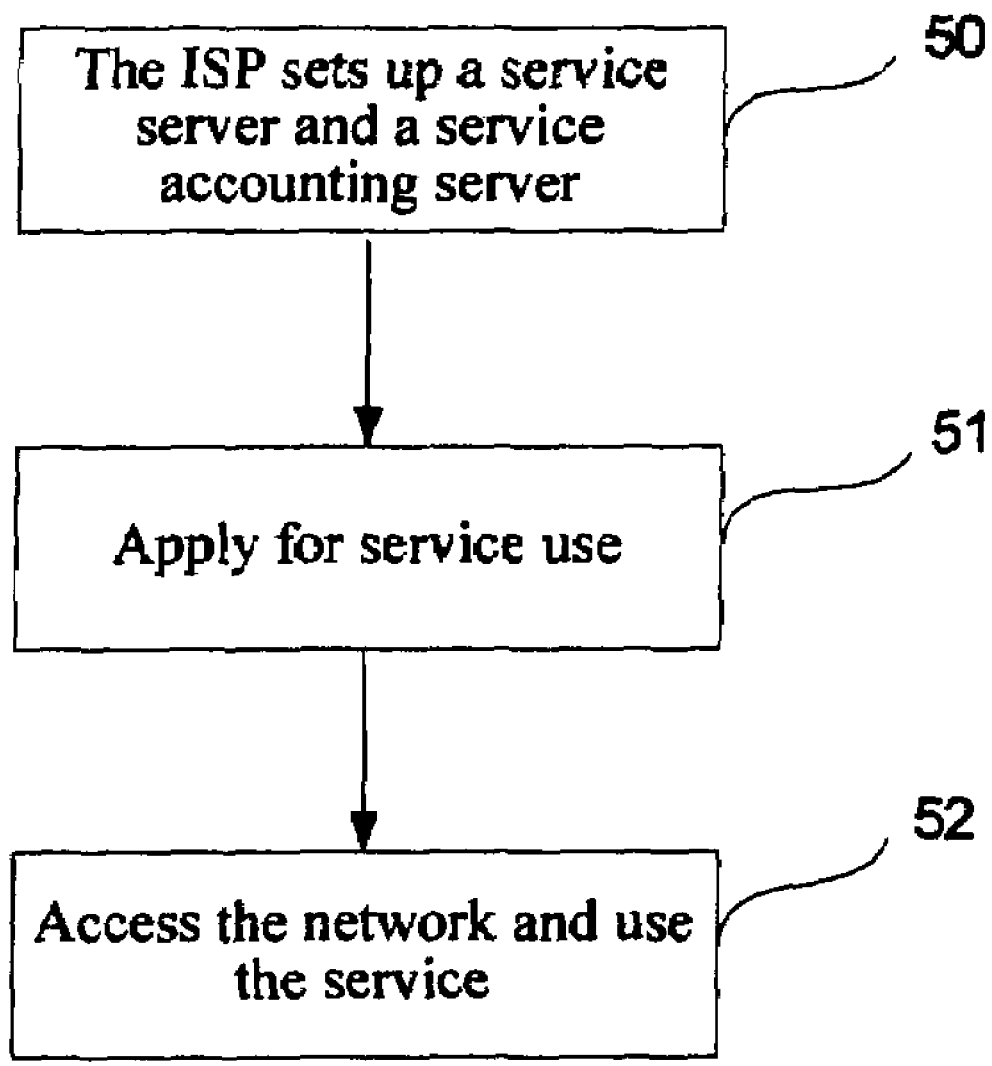
FIG. 5 is a flow diagram of adding a service in the embodiment of the network authentication, authorization and accounting method of the present invention.

Please referring to FIG. 5, the flow of adding a new service by a service provider is as follows:

a. step 50: the service provider sets up a service server 5 and a service accounting server 6 to provide the new service; wherein, as for accounting, the service provider negotiates with the network access provider to determine the accounting data acquisition mode and division of earnings;

b. step 51: determine whether the service is default; if the service is not default, the subscriber applies for service use to the service provider, and the service accounting server 6 stores the data (including identification information for subscriber identity and the qualification, wherein the subscriber identity is an user ID assigned by the network access provider to the subscriber); if the service is default, it will be provided to all subscribers;

c. step 52: execute step 30-35: the subscriber accesses the network with his/her identity information for network access (e.g., user name and password, etc) and uses the service (that is to say, the subscriber accesses the network and the service with the same ID).

Any other service can be added through the same process (a-c), and the service can be used with the access identity information (e.g., user name and password, etc) (that is to say, multiple categories of services can be used with the same subscriber ID). In this way, the subscriber can access different types of services with the same subscriber identification information (user name and password) through a single identity authentication process, and accounting can be performed centrally, which facilitates the subscribers to use the network and services.

The invention claimed is:

1. A network authentication, authorization and accounting system, comprising:

a subscriber device, via which a subscriber is connected with the network;

an access server, connected with the subscriber device and designed to enable the subscriber device to access the network;

an AAA server, connected with the access server and designed to collaborate with the access server to accomplish authentication, authorization, and accounting for the subscriber accessing the network;

wherein, said system further comprises:

a service server, connected with the access server, designed to provide specific services, to exchange authentication and authorization information with the AAA server, and to interact with the subscriber device to provide the service;

a service accounting server, connected with the service server, designed to collaborate with the service server to accomplish accounting for service resource use of the subscriber, and to send the accounting data to the AAA server;

wherein, the access server can provide QoS guarantee for service, while the AAA server incorporates the access accounting data with the service accounting data; and wherein, the service server is designed to verify identity information and authorization information of the subscriber by searching in the AAA server via the service accounting server, and authorize the subscriber to access the service.

2. The network authentication, authorization and accounting system according to claim 1, wherein the service server stores service resource use records.

3. The network authentication, authorization and accounting system according to claim 1, wherein the service accounting server and the AAA server are populated in a single host.

4. The network authentication, authorization and accounting system according to claim 1, wherein the service server is a cluster of devices that provide a type of service.

5. A network authentication, authorization and accounting method comprising:
  a. a network access request step, in which a subscriber logs in a subscriber device which sends a network access request;
  b. an authentication and authorization step, in which an AAA server authenticates the subscriber in collaboration with an access server according to identity information of the subscriber, and authorizes or refuses the subscriber device to access the network;
  c. a service access request step, in which the subscriber device authorized to access the network sends a service access request containing the identity information of the subscriber to a service server;
  d. a determination and service authorization step, in which the service server searches for the identification information stored in the AAA server via a service accounting server, and determines whether the identification information matches the identity information of the subscriber and the corresponding qualification; if so, the service server accepts the access request and authorize the subscriber device to access the service; otherwise the service server refuses to provide the service;
  e. a service accounting step, in which the service server sends a service resource use record to the service accounting server, and the service accounting server creates accounting data according to the service resource use;
  f. the AAA server receives the service accounting data and incorporates it with the access accounting data.

6. The network authentication, authorization and accounting method according to claim 5, wherein step b further comprises the following steps of:
  when receiving the access request, the access server sending an authentication request to the AAA server;
  after authenticating the subscriber, the AAA server sending an authentication response to the access server;
  when receiving the authentication response, the access server sending an access response to the subscriber device, and the subscriber device being authorized or refused to access the network.

7. The network authentication, authorization and accounting method according to claim 6, wherein the subscriber identity information comprises identification information and additional attribute information, and the identity information is presented in the form of Public Key Certificate/Attribute Certificate, Token, Credential.

8. The network authentication, authorization and accounting method according to claim 5, wherein step d further comprises a service use request/authentication step in which the particular qualification of the subscriber is determined according to the condition of service resources and the subscriber identity.

9. The network authentication, authorization and accounting method according to claim 8, wherein the subscriber identity information comprises identification information and additional attribute information, and the identity information is presented in the form of Public Key Certificate/Attribute Certificate, Token, Credential.

10. The network authentication, authorization and accounting method according to claim 5, wherein in step f, the service accounting server sends the service accounting data to the AAA server periodically or in event-driven manner.

11. The network authentication, authorization and accounting method according to claim 10, wherein the subscriber identity information comprises identification information and additional attribute information, and the identity information is presented in the form of Public Key Certificate/Attribute Certificate, Token, Credential.

12. The network authentication, authorization and accounting method according to claim 5, wherein in step f, the AAA server obtains the service accounting data by searching in the service accounting server periodically or in event-driven manner.

13. The network authentication, authorization and accounting method according to claim 12, wherein the subscriber identity information comprises identification information and additional attribute information, and the identity information is presented in the form of Public Key Certificate/Attribute Certificate, Token, Credential.

14. The network authentication, authorization and accounting method according to claim 5, wherein said method comprises the following steps for adding a new service:
  the service provider setting up a service server and a service accounting server to provide the service;
  determining whether the service is default; if the service is default, it will be provided to all subscribers; if the service is not default, the subscriber applying for service use to the service provider, and the service accounting server storing the identification information for subscriber identity and the qualification;
  executing steps a-f.

15. The network authentication, authorization and accounting method according to claim 14, wherein the subscriber identity information comprises identification information and additional attribute information, and the identity information is presented in the form of Public Key Certificate/Attribute Certificate, Token, Credential.

16. The network authentication, authorization and accounting method according to claim 5, wherein the subscriber identity information comprises identification information and additional attribute information, and the identity information is presented in the form of Public Key Certificate/Attribute Certificate, Token, Credential.

* * * * *

UNITED STATES PATENT AND TRADEMARK OFFICE
CERTIFICATE OF CORRECTION

| | | |
|---|---|---|
| PATENT NO. | : 7,653,933 B2 | Page 1 of 1 |
| APPLICATION NO. | : 10/558751 | |
| DATED | : January 26, 2010 | |
| INVENTOR(S) | : Fuyou Miao | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Twenty-third Day of November, 2010

David J. Kappos
*Director of the United States Patent and Trademark Office*